US011179976B2

(12) United States Patent
Patel et al.

(10) Patent No.: US 11,179,976 B2
(45) Date of Patent: Nov. 23, 2021

(54) WORK VEHICLE WITH PARTIALLY ROTATABLE TIRE INFLATION PACK

(71) Applicant: CNH Industrial America LLC, New Holland, PA (US)

(72) Inventors: Arvind Patel, Elk Grove Village, IL (US); Michael R. Jensen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 377 days.

(21) Appl. No.: 16/411,240

(22) Filed: May 14, 2019

(65) Prior Publication Data

US 2020/0361252 A1    Nov. 19, 2020

(51) Int. Cl.
*B60C 23/00*    (2006.01)

(52) U.S. Cl.
CPC ................... *B60C 23/001* (2013.01)

(58) Field of Classification Search
CPC ............ B60C 23/001; B60C 23/00345; B60C 23/00336
USPC ....... 152/415–417; 73/129, 488, 146, 146.5; 340/448, 454
See application file for complete search history.

(56) References Cited

U.S. PATENT DOCUMENTS

| | | | |
|---|---|---|---|
| 4,431,043 A | 2/1984 | Goodell et al. | |
| 4,883,106 A | 11/1989 | Schultz et al. | |
| 4,892,128 A | 1/1990 | Bartos | |
| 4,895,199 A | 1/1990 | Magnuson et al. | |
| 5,080,156 A | 1/1992 | Bartos | |
| 5,263,524 A | 11/1993 | Boardman | |
| 5,313,995 A | 5/1994 | Schultz | |
| 5,398,743 A | 3/1995 | Bartos | |
| 5,429,167 A | 7/1995 | Jensen | |
| 6,145,558 A | 11/2000 | Schmitz | |
| 6,145,559 A | 11/2000 | Ingram, II | |
| 6,425,427 B1 | 7/2002 | Stech | |
| 6,585,019 B1 | 7/2003 | Ingram | |
| 7,185,688 B2 * | 3/2007 | Hayes | .................. B60C 23/003 152/415 |

(Continued)

OTHER PUBLICATIONS

"Performance Live Axle Portal Reduction Hub", Performance Motorsport, retrieved from https://www.proformance.com.au/off-road-live-axle-portal-hub (5 pages).

*Primary Examiner* — Eric Blount
(74) *Attorney, Agent, or Firm* — Rickard K. DeMille; Rebecca L. Henkel

(57) ABSTRACT

An axle assembly for a work vehicle includes: a frame housing; a differential housed in the frame housing; an axle carrier coupled to the frame housing; an axle partially disposed in the axle carrier and coupled to the differential; and a tire inflation pack including: a fixed portion coupled to the axle carrier and comprising a pack fluid inlet that is configured to fluidly couple to a pressurized gas source and a fixed opening holding the axle therein, the fixed portion being configured to allow rotation of the axle in the fixed opening without rotating; and a rotatable portion rotatably coupled to the fixed portion and comprising a pack fluid outlet that is fluidly coupled to the pack fluid inlet and a rotatable opening holding the axle therein, the rotatable portion being fluidly sealed with the fixed portion and configured to rotate with the axle.

19 Claims, 5 Drawing Sheets

(56) References Cited

U.S. PATENT DOCUMENTS

| | | |
|---|---|---|
| 7,690,412 B1 | 4/2010 | Jenkinson et al. |
| 8,869,850 B2 | 10/2014 | Stech |
| 10,179,484 B2 | 1/2019 | Hennig |
| 2005/0161136 A1 | 7/2005 | Hayes et al. |
| 2016/0152100 A1* | 6/2016 | Berkness ................ B60B 35/14 |
| | | 301/6.5 |
| 2020/0062047 A1* | 2/2020 | Bonora ................ B60C 23/003 |

* cited by examiner

WORK VEHICLE WITH PARTIALLY ROTATABLE TIRE INFLATION PACK

FIELD OF THE INVENTION

The present invention pertains to work vehicles and, more specifically, to work vehicles with central tire inflation systems.

BACKGROUND OF THE INVENTION

Certain work vehicles (e.g., tractors, harvesters, skid steers, etc.) ride on wheels with gas-inflated tires. The tires are inflated with pressurized gas, such as air, to maintain their size and reduce the risk of excessive pressure being exerted on the ground during travel. Some work vehicles include a central tire inflation system including a pressurized gas source, such as a compressor or dryer, to maintain the air pressure in the tires, but it can be difficult to deliver pressurized gas from the stationary pressurized gas source to the rotating tires during operation.

What is needed in the art is a work vehicle that can effectively inflate and deflate the tires during rotation of the tires.

SUMMARY OF THE INVENTION

Exemplary embodiments disclosed herein provide an axle assembly including a tire inflation pack with a fixed portion mounted to an axle carrier and a rotatable portion fluidly sealed with the fixed portion that can rotate with an axle.

In some exemplary embodiments provided in accordance with the present disclosure, an axle assembly for a work vehicle includes: a frame housing; a differential housed in the frame housing; an axle carrier coupled to the frame housing; an axle partially disposed in the frame housing and the axle carrier; and a tire inflation pack. The tire inflation pack includes: a fixed portion coupled to the axle carrier and comprising a pack fluid inlet that is configured to fluidly couple to a pressurized gas source and a fixed opening holding the axle therein, the fixed portion being configured to allow rotation of the axle in the fixed opening without rotating; and a rotatable portion rotatably coupled to the fixed portion and comprising a pack fluid outlet that is fluidly coupled to the pack fluid inlet and a rotatable opening holding the axle therein, the rotatable portion being fluidly sealed with the fixed portion and configured to rotate with the axle.

In some exemplary embodiments provided in accordance with the present disclosure, a work vehicle includes: a chassis; a frame housing carried by the chassis; a differential housed in the frame housing; an axle carrier coupled to the frame housing; an axle partially disposed in the frame housing and the axle carrier; a pressurized gas source carried by the chassis and comprising a gas outlet; and a tire inflation pack. The tire inflation pack includes: a fixed portion coupled to the axle carrier and comprising a pack fluid inlet fluidly coupled to the gas outlet and a fixed opening holding the axle therein, the fixed portion being configured to allow rotation of the axle in the fixed opening without rotating; and a rotatable portion rotatably coupled to the fixed portion and comprising a pack fluid outlet that is fluidly coupled to the pack fluid inlet and a rotatable opening holding the axle therein, the rotatable portion being fluidly sealed with the fixed portion and configured to rotate with the axle.

One possible advantage that may be realized by exemplary embodiments disclosed herein is that coupling the fixed portion to the axle carrier can allow for mounting of the tire inflation pack to a static location that is easily accessible.

Another possible advantage that may be realized by exemplary embodiments disclosed herein is that the rotatable portion being able to rotate with the axle allows the pack fluid outlet to couple to a valve of a rotating tire and operate during rotation of the tire.

BRIEF DESCRIPTION OF THE DRAWINGS

For the purpose of illustration, there are shown in the drawings certain embodiments of the present disclosure. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
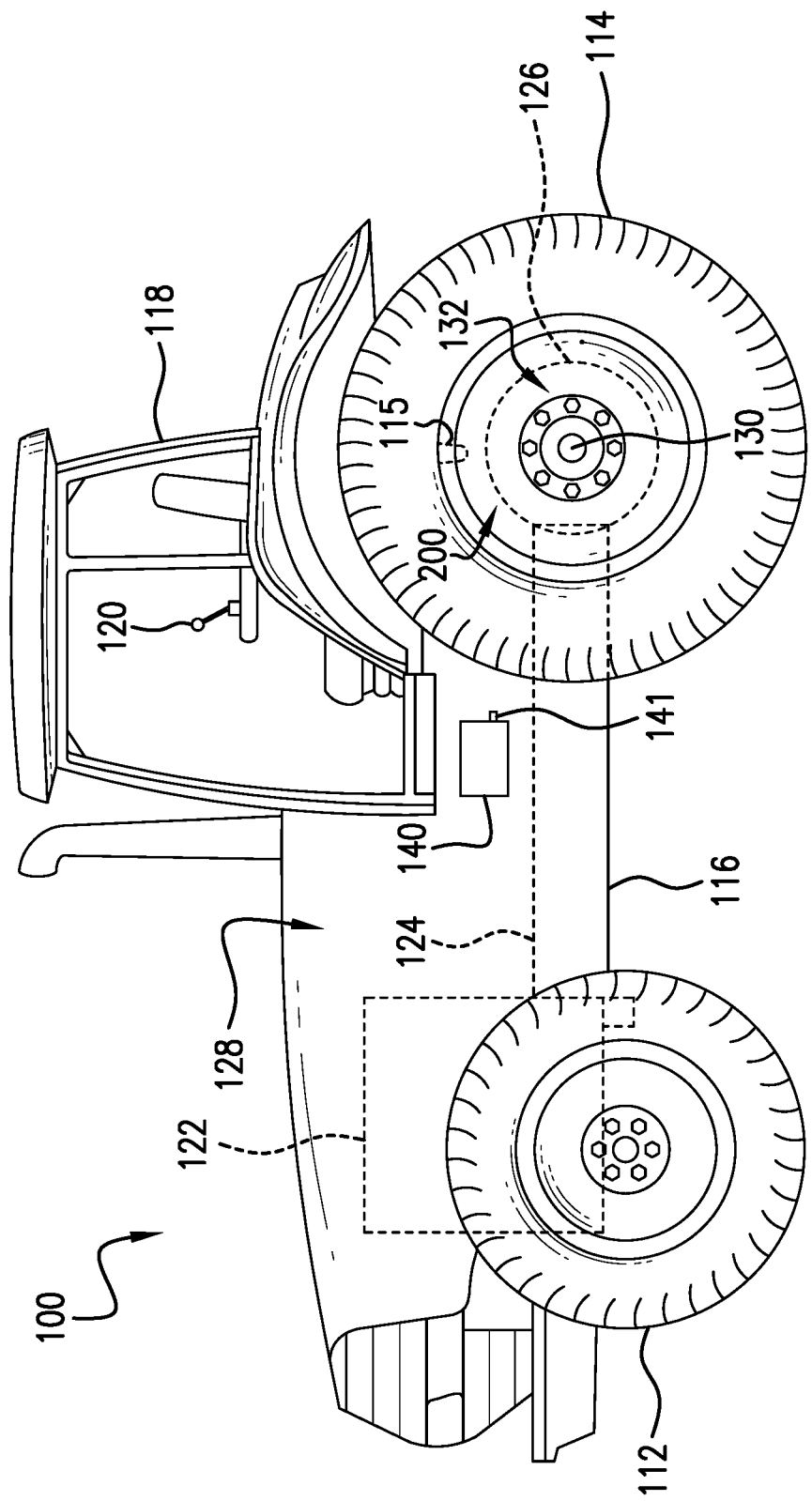
FIG. 1 illustrates a side view of an exemplary embodiment of a work vehicle, the work vehicle comprising a chassis, a pressurized gas source, and an axle assembly, in accordance with an exemplary embodiment of the present disclosure.

Referring now to the drawings, and more particularly to FIG. 1, an exemplary embodiment of a work vehicle 100 is illustrated. As shown, the work vehicle 100 is configured as an agricultural tractor. However, in other embodiments, the work vehicle 100 may be configured as any other type of work vehicle, such as various other agricultural vehicles, earth-moving vehicles, road vehicles, loaders and/or the like.

As shown in FIG. 1, the work vehicle 100 includes a pair of front tires 112, a pair of rear tires 114 and a chassis 116 coupled to and supported by the tires 112, 114. An operator cab 118 may be supported by a portion of the chassis 116 and may house various control devices 120 (e.g., levers, pedals, control panels and/or the like) for permitting an operator to control the overall operation of the work vehicle 100. Additionally, the work vehicle 100 includes an engine 122 and a transmission 124 mounted on the chassis 116. The transmission 124 may be operably coupled to the engine 122 and may provide variably adjusted gear ratios for transferring engine power to the tires 114 via a differential 126. The engine 122, transmission 124, and differential 126 may collectively define a drive train 128 of the work vehicle 100. To transmit power from the differential 126 to each of the tires 114, an axle 130 is coupled to the differential 126 as well as a wheel hub 132 on which the tire 114 is mounted. Thus, rotation of the axle 130 by the differential 126 causes a corresponding rotation of the wheel hub 132 and mounted tire 114.

Referring now to FIGS. 2-5, an axle assembly 200 provided according to the present disclosure is illustrated. The axle assembly 200 includes a frame housing 210 (illustrated in FIG. 2), which houses the differential 126 and may be a rear frame housing, an axle carrier 220 coupled the frame housing 210, and the previously described axle 130. The axle 130 is partially disposed in the frame housing 210 and the axle carrier 220, as can be appreciated from FIGS. 2 and 4, and coupled to the differential 126. The frame housing 210 is carried by the chassis 116 such that the frame housing 210 is generally static relative to the chassis 116, allowing components of the differential 126 and the axle 130 to rotate within the frame housing 210 and transmit power to the tires 114. The frame housing 210 may have any suitable shape for housing the differential 126 and axle 130 therein.

Figure 2:
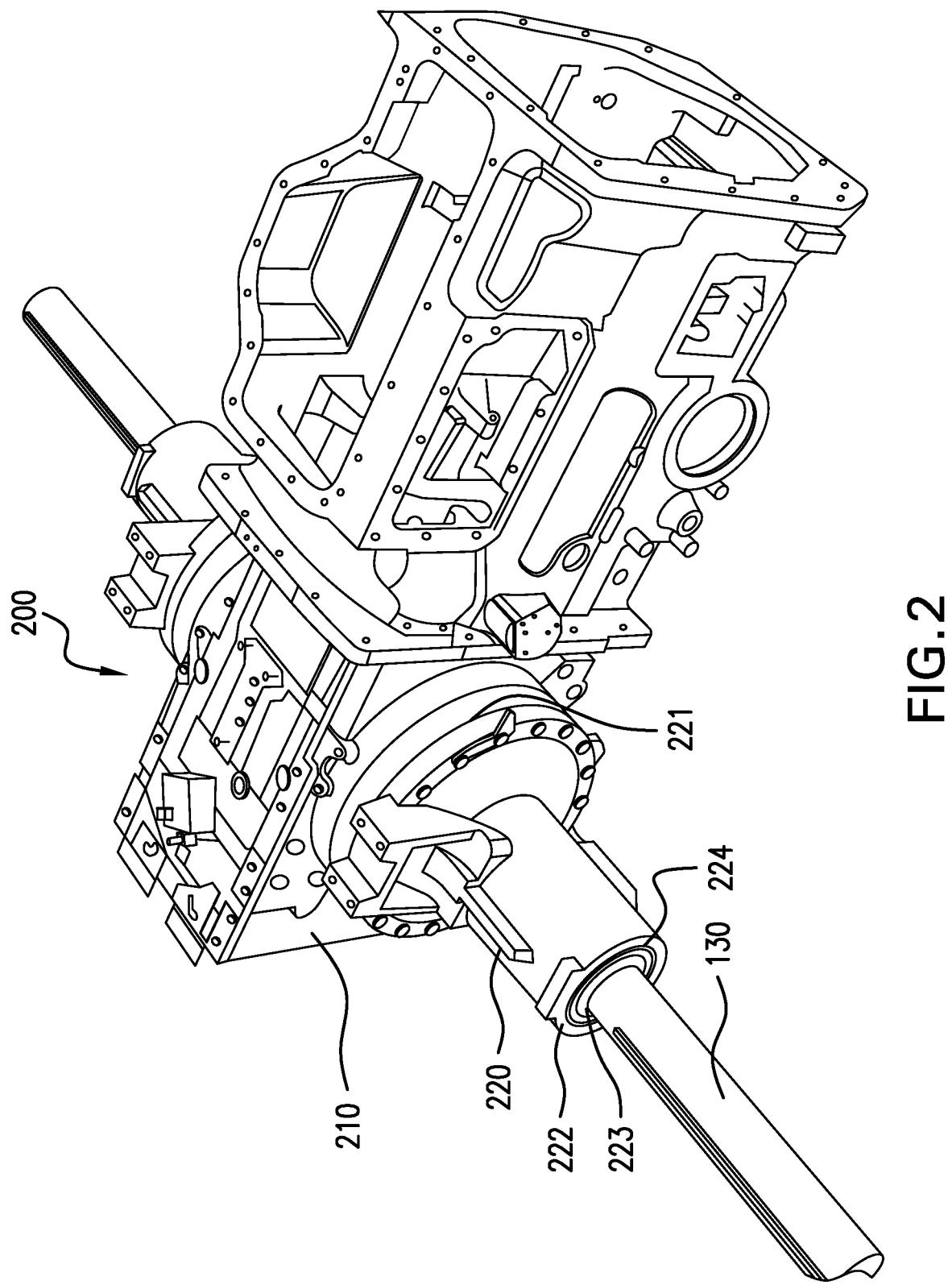
FIG. 2 illustrates a perspective view of the axle assembly illustrated in FIG. 1 without a tire inflation pack.
Figure 3:
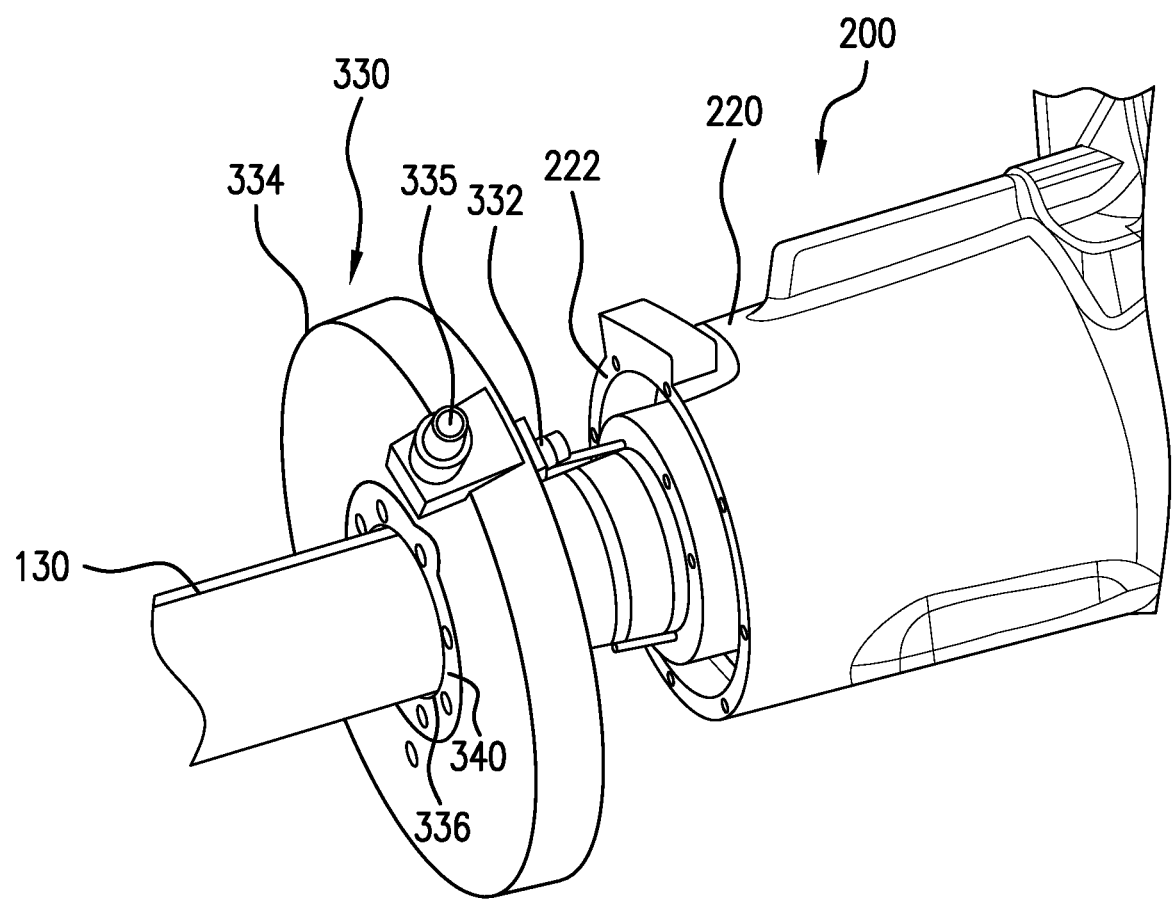
FIG. 3 illustrates a tire inflation pack being mounted on the axle assembly illustrated in FIGS. 1 and 2, in accordance with an exemplary embodiment of the present disclosure.
Figure 4:
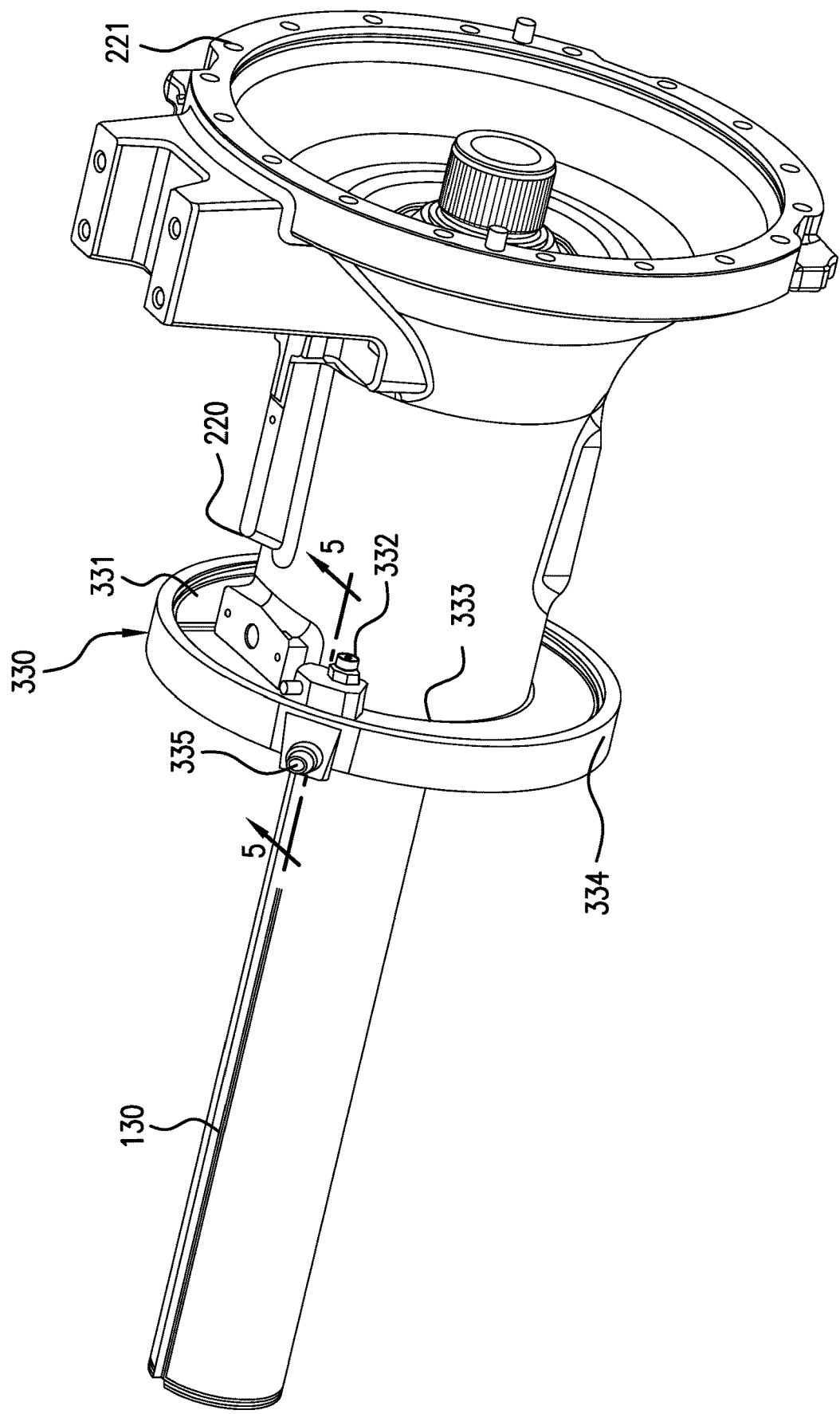
FIG. 4 is a perspective view of the axle assembly illustrated in FIGS. 2-3 with the tire inflation pack mounted to an axle carrier.

The axle carrier 220, by virtue of its coupling to the frame housing 210, is also generally static relative to the chassis 116. As illustrated in FIGS. 2-4, the axle carrier 220 may have a generally cylindrical shape with a first end face 221 that is coupled to the frame housing 210 and a second end face 222 opposite the first end face 221 that faces the wheel hub 132 and the tire 114. In this respect, the first end face 221 may be referred to as an "internal end face" while the second end face 222 may be referred to as an "external end face." A diameter of the internal end face 221 may be greater than a diameter of the external end face 222, with the diameter of the external end face 222 being slightly greater than an axle diameter of the axle 130 to stably support the axle 130 and reduce the likelihood of linear displacement of the axle 130 during operation. In some embodiments, an axle bearing 223 may disposed in an axle opening 224 formed in the external end face 222 and support the axle 130.

In known work vehicles, the tires may be kept inflated by a central tire inflation system that is located near a centerline of the work vehicle. In this respect, known tire inflation systems are generally "internal" to the work vehicle and difficult to install and service. Further, it is difficult to retrofit work vehicles that lack tire inflation systems with known tire inflation systems because the mounting areas are normally difficult to reach.

To address some of the previously described issues of known tire inflation systems, a tire inflation pack 330 (first illustrated in FIG. 3) is provided that mounts to the axle carrier 220 and allows inflation of the tire 114 by coupling a pressurized gas source 140 (illustrated in FIG. 1), such as a compressor or a dryer, to a tire valve 115 (illustrated in FIG. 1) that is fluidly coupled to an interior volume of the tire 114. The coupling between the pressurized gas source 140 and the tire valve 115 allows pressurized gas provided by the pressurized gas source 140 to travel into the interior volume of the tire 114 and inflate the tire 114. The tire inflation pack 330 includes a fixed portion 331 that is coupled to the axle carrier 220 and has a pack fluid inlet 332 that fluidly couples to a gas outlet 141 (illustrated in FIG. 1) of the pressurized gas source 140. The axle 130 is held in a fixed opening 333 of the fixed portion 331 such that the fixed portion 331 allows rotation of the axle 130 in the fixed opening 333 without rotating. In other words, the axle 130 does not cause a corresponding rotation of the fixed portion 331 during rotation of the axle 130.

A rotatable portion 334 of the tire inflation pack 330 is rotatably coupled to the fixed portion 331 and includes a pack fluid outlet 335 that is fluidly coupled to the pack fluid inlet 332 of the fixed portion 331. The axle 130 is also held in a rotatable opening 336 of the rotatable portion 334. The rotatable portion 334 is fluidly sealed with the fixed portion 331 so that gas, such as pressurized air, entering the pack fluid inlet 332 may exit the tire inflation pack 330 through the pack fluid outlet 335. Unlike the fixed portion 331, the rotatable portion 334 is configured to rotate with the axle 130. By rotating with the axle 130, the pack fluid outlet 335 of the rotatable portion 334 is able to couple to the tire valve 115 via a fluid line 337 without the fluid line 337 getting twisted by the rotating tire valve 115 during rotation of the tire 114. Thus, the tire inflation pack 330 can be used to inflate the tires 114 with pressurized gas from the pressurized gas source 140, which may be generally static relative to the chassis 116.

To fluidly couple the pack fluid inlet 332 to the pack fluid outlet 335, the tire inflation pack 330 may comprise a fluid chamber 338 that is defined between the fixed portion 331 and the rotatable portion 334. The fluid chamber 338 may be formed by, for example, one or more channels 339A formed in the fixed portion 331 and connected to the pack fluid inlet 332 and one or more channels 339B formed in the rotatable portion 334 and connected to the pack fluid outlet 335. The channels 339A, 339B may be formed in the respective portions 331, 334 by, for example, molding or casting. It should be appreciated that the previously described way of fluidly coupling the pack fluid inlet 332 to the pack fluid outlet 335 is exemplary only, and other ways of fluidly coupling the pack fluid inlet 332 to the pack fluid outlet 335 may be utilized according to the present disclosure.

The tire inflation pack 330 may be mounted to the external end face 222 of the axle carrier 220 by sliding the tire inflation pack 330 along the axle 130 and bolting the fixed portion 331 to the external end face 222, as can be appreciated from FIGS. 3 and 4. The rotatable portion 334, on the other hand, may be bolted to a bushing 340 that is fixed on the axle 130, so the rotatable portion 334 can rotate with the axle 130. The pack fluid inlet 332 may be fluidly coupled to the pressurized gas source 140 and the pack fluid outlet 335 may be fluidly coupled to the tire valve 115 by respective fluid lines. In this respect, the tire inflation pack 330 may be easily and conveniently installed from an external location where an installer does not need to significantly go into the inner workings of the work vehicle 100.

Figure 5:
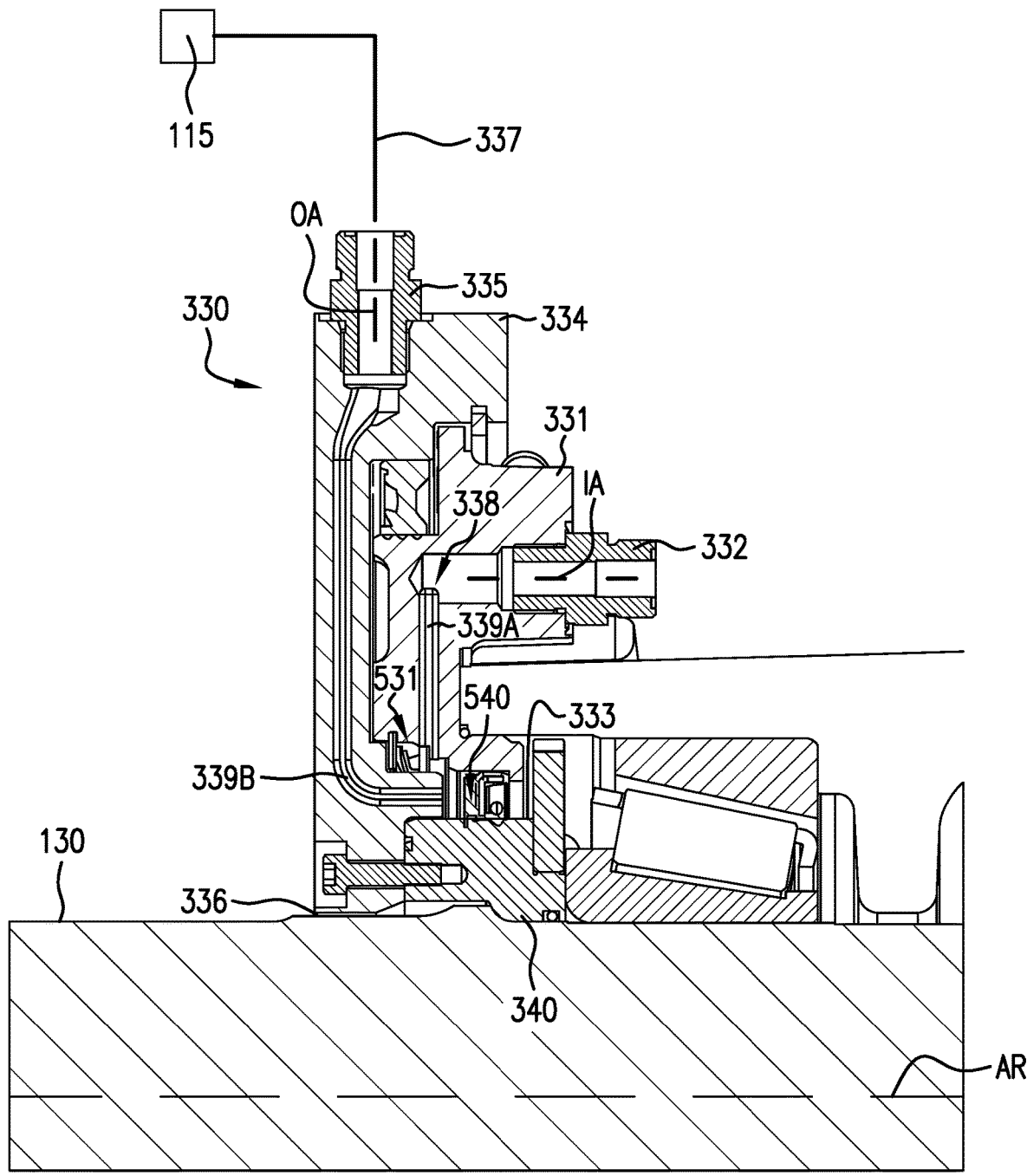
FIG. 5 is a cross-sectional view of the tire inflation pack illustrated in FIGS. 3-4 taken along line 5-5.

To fluidly seal the rotatable portion 334 to the fixed portion 331, the tire inflation pack 330 may include one or more seals, illustrated as one seal 531 in FIG. 5, disposed between the fixed portion 331 and the rotatable portion 334. The seal 531 may comprise, for example, an elastomeric material that deforms in the presence of increased fluid pressure to form an air-tight seal between two components, as is known. In some embodiments, the seal 531 may be configured to form an air-tight seal at a variety of pressures, such as between 5 PSI and 120 PSI. The seal 531 may be any seal that is suitable to fluidly seal the dynamic rotatable portion 334 to the static fixed portion 331, with many such configurations being known, so further description is omitted for brevity. The tire inflation pack 330 may also include an oil-air separator 540 (illustrated in FIG. 5) that reduces the risk of lubricating oil on the rotatable portion 334 from infiltrating the fluid chamber 338 and pressurized gas leaking from the fluid chamber 338.

In some embodiments, the rotatable portion 334 at least partially surrounds the fixed portion 331. As illustrated in FIGS. 3-5, the fixed portion 331 may have a circumferential periphery, i.e., be ring-shaped, that is surrounded by the rotatable portion 334 so the rotatable portion 334 acts as a cover for the fixed portion 331. In other words, the fixed portion 331 and the rotatable portion 334 can both be concentric with the axle 130. The pack fluid inlet 332 may define a fluid inlet axis IA and the pack fluid outlet 335 may define a fluid outlet axis OA that is non-parallel to the fluid inlet axis IA, such as perpendicular to the fluid inlet axis IA. The fluid outlet axis OA may also extend radially relative to an axis of rotation AR of the axle 130. Such a configuration allows the fluid line 337 fluidly coupling the pack fluid outlet 335 to the tire valve 115 to rotate with the rotatable portion 334 at a safe distance from the axle 130 to reduce the risk of the fluid line 337 getting twisted about the axle 130 during rotation, which can damage the fluid line 337 and/or the tire valve 115.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An axle assembly for a work vehicle, comprising:
    a frame housing;
    a differential housed in the frame housing;
    an axle carrier coupled to the frame housing;
    an axle partially disposed in the axle carrier and coupled to the differential; and
    a tire inflation pack comprising:
        a fixed portion coupled to the axle carrier and comprising a pack fluid inlet that is configured to fluidly couple to a pressurized gas source and a fixed opening holding the axle therein, the fixed portion being configured to allow rotation of the axle in the fixed opening without rotating; and
        a rotatable portion rotatably coupled to the fixed portion and comprising a pack fluid outlet that is fluidly coupled to the pack fluid inlet and a rotatable opening holding the axle therein, the rotatable portion being fluidly sealed with the fixed portion and configured to rotate with the axle.

2. The axle assembly of claim 1, wherein the tire inflation pack comprises a fluid chamber defined between the fixed portion and the rotatable portion and fluidly coupled to the pack fluid inlet and the pack fluid outlet.

3. The axle assembly of claim 2, wherein the fluid chamber comprises a first channel formed in the fixed portion and fluidly coupled to the pack fluid inlet and a second channel formed in the rotatable portion and fluidly coupled to the first channel and the pack fluid outlet.

4. The axle assembly of claim 1, wherein the axle carrier comprises an end face and the fixed portion is mounted to the end face.

5. The axle assembly of claim 1, wherein the rotatable portion at least partially surrounds the fixed portion.

6. The axle assembly of claim 5, wherein the fixed portion comprises a circumferential periphery that is entirely surrounded by the rotatable portion.

7. The axle assembly of claim 1, wherein the pack fluid inlet defines a fluid inlet axis and the pack fluid outlet defines a fluid outlet axis that is non-parallel to the fluid inlet axis.

8. The axle assembly of claim 7, wherein the fluid outlet axis is perpendicular to the fluid inlet axis.

9. The axle assembly of claim 1, further comprising at least one seal disposed between the fixed portion and the rotatable portion and configured to form an air-tight seal between the fixed portion and the rotatable portion.

10. A work vehicle, comprising:
    a chassis;
    a frame housing carried by the chassis;
    a differential housed in the frame housing;
    an axle carrier coupled to the frame housing;
    an axle partially disposed in the axle carrier and coupled to the differential;
    a pressurized gas source carried by the chassis and comprising a gas outlet; and
    a tire inflation pack comprising:
        a fixed portion coupled to the axle carrier and comprising a pack fluid inlet fluidly coupled to the gas outlet and a fixed opening holding the axle therein, the fixed portion being configured to allow rotation of the axle in the fixed opening without rotating; and
        a rotatable portion rotatably coupled to the fixed portion and comprising a pack fluid outlet that is fluidly coupled to the pack fluid inlet and a rotatable opening holding the axle therein, the rotatable portion being fluidly sealed with the fixed portion and configured to rotate with the axle.

11. The work vehicle of claim 10, wherein the tire inflation pack comprises a fluid chamber defined between the fixed portion and the rotatable portion and fluidly coupled to the pack fluid inlet and the pack fluid outlet.

12. The work vehicle of claim 11, wherein the fluid chamber comprises a first channel formed in the fixed portion and fluidly coupled to the pack fluid inlet and a second channel formed in the rotatable portion and fluidly coupled to the first channel and the pack fluid outlet.

13. The work vehicle of claim 10, wherein the axle carrier comprises an end face and the fixed portion is mounted to the end face.

14. The work vehicle of claim 10, wherein the rotatable portion at least partially surrounds the fixed portion.

15. The work vehicle of claim 14, wherein the fixed portion comprises a circumferential periphery that is entirely surrounded by the rotatable portion.

16. The work vehicle of claim 10, wherein the pack fluid inlet defines a fluid inlet axis and the pack fluid outlet defines a fluid outlet axis that is non-parallel to the fluid inlet axis.

17. The work vehicle of claim 16, wherein the fluid outlet axis is perpendicular to the fluid inlet axis.

18. The work vehicle of claim 10, further comprising at least one seal disposed between the fixed portion and the rotatable portion and configured to form an air-tight seal between the fixed portion and the rotatable portion.

19. The work vehicle of claim 10, further comprising a tire mounted to the axle and comprising a tire valve that is fluidly coupled to the pack fluid outlet.

* * * * *